United States Patent
Matsuda (10) Patent No.: US 8,823,213 B2
(45) Date of Patent: Sep. 2, 2014

(54) ELECTRIC POWER SELLING SYSTEM (75) Inventor: Takehiro Matsuda, Tsu (JP)

(73) Assignee: Panasonic Corporation, Kadoma-shi (JP)

( * ) Notice: Subject to any disclaimer, the term of this patent is extended or adjusted under 35 U.S.C. 154(b) by 508 days.

(21) Appl. No.: 12/908,441

(22) Filed: Oct. 20, 2010

(65) Prior Publication Data
US 2011/0095616 A1    Apr. 28, 2011

(30) Foreign Application Priority Data

Oct. 26, 2009    (JP) ................. 2009-245941

(51) Int. Cl.
*H02J 3/38*    (2006.01)
*H02J 3/46*    (2006.01)
*H02J 3/00*    (2006.01)
*H02J 13/00*    (2006.01)

(52) U.S. Cl.
CPC . *H02J 3/383* (2013.01); *H02J 3/38* (2013.01); *H02J 3/46* (2013.01); *Y02B 10/14* (2013.01); *Y02E 10/563* (2013.01); *H02J 3/008* (2013.01); *H02J 13/002* (2013.01)
USPC ............................................. 307/87; 307/84

(58) Field of Classification Search
CPC .................................... H02J 3/38; H02J 3/46
USPC ........................................... 307/84, 87
See application file for complete search history.

(56) References Cited

U.S. PATENT DOCUMENTS

| | | | |
|---|---|---|---|
| 6,111,767 A |   | 8/2000 | Handleman |
| 6,169,678 B1 | * | 1/2001 | Kondo et al. ................. 363/71 |
| 6,925,361 B1 | * | 8/2005 | Sinnock ....................... 700/286 |
| 7,224,081 B2 | * | 5/2007 | Larsen ............................. 290/44 |
| 7,709,727 B2 | * | 5/2010 | Roehrig et al. ................ 136/243 |
| 7,783,390 B2 | * | 8/2010 | Miller ............................. 700/291 |
| 7,925,552 B2 | * | 4/2011 | Tarbell et al. ................... 705/30 |
| 7,929,327 B2 | * | 4/2011 | Haines et al. ................... 363/95 |
| 8,013,472 B2 | * | 9/2011 | Adest et al. ..................... 307/77 |
| 8,058,747 B2 | * | 11/2011 | Avrutsky et al. ................ 307/43 |
| 8,080,899 B2 | * | 12/2011 | Paull ............................... 307/51 |
| 8,200,370 B2 | * | 6/2012 | Paik ............................... 700/291 |

(Continued)

FOREIGN PATENT DOCUMENTS

EP    1777793 A2    4/2007
JP    2000-287390 A    10/2000

(Continued)

*Primary Examiner* — Adi Amrany
(74) *Attorney, Agent, or Firm* — Marvin A. Motsenbocker; Mots Law, PLLC (57) ABSTRACT It is an object of the present invention to suppress such a situation that electric power selling becomes impossible while the deterioration of supply power is prevented. The electric power selling system of the present invention comprises a solar battery 3 as a power generator, and a control unit 7 which is connected with the solar battery 3 and a distribution line and configured to convert output voltage of the solar battery 3 into variable voltage for electric power selling. The electric power selling system further comprises a transmitter 60 connected with the distribution line, said transmitter 60 being configured to measure voltage of the distribution line and to supply the control unit 7 with an instruction value obtained based on the measured voltage value. The control unit 7 is configured to convert the output voltage of the solar battery 3 into the voltage for electric power selling based on the instruction value.

20 Claims, 3 Drawing Sheets

(56) References Cited

U.S. PATENT DOCUMENTS

| | | | |
|---|---|---|---|
| 8,352,091 B2* | 1/2013 | Haugh | 700/286 |
| 2002/0036430 A1* | 3/2002 | Welches et al. | 307/18 |
| 2003/0047209 A1* | 3/2003 | Yanai et al. | 136/291 |
| 2004/0027112 A1* | 2/2004 | Kondo et al. | 323/355 |
| 2005/0029476 A1 | 2/2005 | Biester et al. | |
| 2005/0105224 A1* | 5/2005 | Nishi | 361/18 |
| 2005/0105306 A1 | 5/2005 | Deng et al. | |
| 2005/0275386 A1 | 12/2005 | Jepsen et al. | |
| 2007/0133241 A1* | 6/2007 | Mumtaz et al. | 363/131 |
| 2007/0271006 A1* | 11/2007 | Golden et al. | 700/295 |
| 2008/0046387 A1* | 2/2008 | Gopal et al. | 705/412 |
| 2008/0097655 A1* | 4/2008 | Hadar et al. | 700/286 |
| 2008/0147335 A1* | 6/2008 | Adest et al. | 702/64 |
| 2008/0150366 A1* | 6/2008 | Adest et al. | 307/77 |
| 2008/0167756 A1* | 7/2008 | Golden et al. | 700/297 |
| 2009/0069950 A1* | 3/2009 | Kurokami et al. | 700/291 |
| 2009/0150005 A1* | 6/2009 | Hadar et al. | 700/286 |
| 2009/0212629 A1* | 8/2009 | Paull | 307/60 |
| 2010/0019573 A1 | 1/2010 | Biester et al. | |
| 2010/0019930 A1 | 1/2010 | Biester et al. | |
| 2010/0306027 A1* | 12/2010 | Haugh | 705/10 |
| 2011/0005567 A1 | 1/2011 | VanderSluis et al. | |
| 2011/0016055 A1* | 1/2011 | Mazzarella | 705/317 |
| 2011/0055036 A1* | 3/2011 | Helfan | 705/26.1 |
| 2011/0204720 A1* | 8/2011 | Ruiz et al. | 307/66 |
| 2012/0188806 A1* | 7/2012 | Tamura et al. | 363/95 |
| 2012/0205985 A1* | 8/2012 | Inakagata | 307/82 |
| 2014/0015449 A1 | 1/2014 | Biester et al. | |

FOREIGN PATENT DOCUMENTS

| | | |
|---|---|---|
| JP | 2001-352682 A | 12/2001 |
| JP | 2006-067672 A | 3/2006 |
| JP | 2006-121853 A | 5/2006 |
| JP | 2008-202983 A | 9/2008 |
| JP | 2009-60720 A | 3/2009 |
| WO | 04/001942 A1 | 12/2003 |
| WO | 2005/111484 A2 | 11/2005 |
| WO | 2008/124144 A1 | 10/2008 |

* cited by examiner

ELECTRIC POWER SELLING SYSTEM

TECHNICAL FIELD

The invention relates generally to an electric power selling system and, more particularly, to an electric power selling system which can suppress the condition that electric power selling cannot be provided.

BACKGROUND ART

With growing ecology mood, private power generation in home using such as a solar battery becomes general. However, the private power generation in home not always can generate electric power according to power consumption of the home. Therefore, electric power may be excessively generated in some hours. For this reason, an electric power trading system is allowed. In the electric power trading system, a user sells excessive electric power back to an electric power company when there is more generated power than power consumption in the home, and buys electric power from the electric power company when generated power is not enough for the home. In this regard, a power monitoring system (for example, refer to Japanese Patent Application Laid-Open No. 2008-202983) or a trading amount estimation system (for example, refer to Japanese Patent Application Laid-Open No. 2009-60720) used for the electric power trading system are proposed.

However, it is known that electric power selling may become impossible if the electric power selling is conducted on a large scale. In order to sell electric power from a home power generator via a general distribution line, the home power generator needs to supply higher voltage than present supplied voltage of the distribution line. For example, if supply voltage of the distribution line is 100V, in order to sell electric power, electric power generated by the home power generator may be converted into, for example, 101V for supplying voltage. However, in this case, if the electric power company will supply the distribution line with electric power of 103V, the electric power of the home power generator can't be sold.

In order to prevent the above condition, generally, supplying voltage of the home power generator is preliminary set relatively high. For example, supplying voltage of the home power generator is set at 105V, electric power can be sold in usual case. Primitively, voltage of a distribution line varies by a variety of factors. Therefore, it is allowed to vary the voltage within a certain range. Therefore, even if electric power is sold at higher voltage than 100V, it doesn't cause problems as long as the voltage falls within the allowed range.

However, further problem may occur when there is a plurality of sellers of electric power. Here, such a case is thought that the allowed range of variation of voltage is 100V with a margin of range of plus or minus 6V, and there are two sellers of electric power A and B in the neighborhood. As mentioned above, when a supplying voltage of a power generator of the seller A is set at 105V, and when there is low power consumption in the neighborhood, voltage of the distribution line in the neighborhood may increase to 105V by the electric power selling of the seller A. In this condition, if the seller B wants to sell electric power, the supplying voltage of a power generator of the seller B needs to be set at, for example, 106V, because the supply voltage of the distribution line is 105V. In this case, during the seller B sells electric power, the seller A becomes impossible to sell electric power. In this case, if the seller A further increases the voltage for electric power selling to 107V, for example, the voltage exceeds the allowed range, and quality of supply power is to be deteriorated.

Also, as mentioned above, voltage of the distribution line varies by a variety of factors. Voltage of the distribution line varies particularly by concern with the relation between supply and demand of electric power, that is, the relation between electric powers supplied from home power generators and consumed power at homes.

For example, there is more consumed power than electric power sold by the home power generators, voltage of the distribution line is maintained at service voltage of the electric power company. On the other hand, if there is less consumed power than electric power sold by the home power generators, voltage of the distribution line increases gradually. Therefore, when voltage of the distribution line increases to reach the voltage for electric power selling, the electric power selling becomes impossible.

DISCLOSURE OF THE INVENTION

It is an object of the present invention to suppress the condition that electric power selling cannot be provided while preventing the deterioration of supply power.

The electric power selling system of the present invention comprises a power generator, and a voltage conversion device which is connected with the power generator and a distribution line and configured to convert output voltage of the power generator into variable voltage for electric power selling, wherein the electric power selling system further comprises a transmitter connected with the distribution line, said transmitter being configured to measure voltage of the distribution line and to supply the voltage conversion device with an instruction value obtained based on the measured voltage value, wherein the voltage conversion device is configured to convert the output voltage of the power generator into the voltage for electric power selling based on the instruction value.

In this configuration, the transmitter is configured to measure voltage of the distribution line to send an instruction value. The voltage conversion device is configured to convert output voltage of the power generator into voltage for electric power selling based on the instruction value. Therefore, difference between the voltage for electric power selling and the voltage of the distribution line can be made small. Also, the condition that electric power selling system cannot be provided is suppressed because the voltage conversion device converts output voltage of the power generator into voltage for electric power selling corresponding to the received instruction value.

The electric power selling system of the present invention may be configured that wherein the power generator comprises a plurality of power generators, each of which is configured to generate electric power capable of electric power selling, wherein the voltage conversion device comprises a plurality of voltage conversion devices, which are connected with the power generators, respectively, and the distribution line, each of said voltage conversion devices being configured to convert output voltage as generated power voltage of the generator into voltage for electric power selling, capable of electric power selling, wherein the distribution line is a low-tension distribution line connected with the plurality of voltage conversion devices, wherein the transmitter is configured to supply the voltage conversion devices with the measured voltage value as the instruction value, wherein each of the voltage conversion devices is configured to decide the voltage for electric power selling based on the measured voltage value.

In this configuration, the transmitter is configured to measure voltage of the distribution line. Each of the voltage conversion devices is configured to decide the voltage for electric power selling based on measured voltage value. For this reason, difference between the voltage for electric power selling and the voltage of the distribution line can be made small. Therefore, more electric energy can be sold within a permitted range of variation of voltage than the prior configuration, in which the voltage for electric power selling is fixed. Then, even if said plurality of power generators simultaneously generate electric power, the system can suppress the condition that electric power selling cannot be provided while preventing the deterioration of supply power.

Preferably, the electric power selling system of the present invention further comprising a plurality of electric energy measurement devices for measuring electric energy to be sold, wherein the transmitter supplies the voltage conversion devices with the measured voltage value via the plurality of electric energy measurement devices, respectively.

In this configuration, electric energy measurement devices for measuring generated electric energy of the power generators, respectively, are further included. The transmitter is configured to supply the voltage conversion devices with the measured voltage value via the electric energy measurement devices, respectively. Generally, an electric energy measurement device for measuring the generated electric energy is an essential device for an electric power selling system. Because the measured voltage value is transmitted via the electric energy measurement device, the measured voltage value can be transmitted to the voltage conversion device without adding other transmitter/receivers.

Preferably, the electric power selling system of the present invention is configured that wherein the transmitter and the electric energy measurement devices are connected by power lines for electric power selling, respectively, wherein the transmitter supplies the electric energy measurement devices with the measured voltage value through the power lines, respectively.

In this configuration, because the transmitter is configured to supply the electric energy measurement devices with the measured voltage value through the power lines for electric power selling, there is no need to use another line for communication. A power line communication (PLC) technique, which is publicly known, can be used for the communication through the power lines.

Preferably, the electric power selling system of the present invention is configured that wherein the electric energy measurement devices and the voltage conversion devices are connected by power lines for electric power selling, respectively, wherein the electric energy measurement devices transmit the measured voltage value to the voltage conversion devices through the power lines, respectively.

In this configuration, because the electric energy measurement devices transmit the measured voltage value to the voltage conversion devices through the power lines for electric power selling, respectively, there is no need to use another line for communication. A power line communication (PLC) technique, which is publicly known, can be used for the communication through the power lines.

The electric power selling system of the present invention may be configured that the system comprises a plurality of electric power supplying systems, wherein the power generator comprises a plurality of power generators included in the plurality of electric power supplying systems, respectively, wherein the voltage conversion device comprises a plurality of voltage conversion devices included in the plurality of electric power supplying systems, respectively, each of the plurality of voltage conversion devices being connected with its own power generator and the distribution line, wherein each of the voltage conversion devices of the electric power supplying systems converts output voltage of its own power generator into identical voltage for electric power selling based on the instruction value supplied from the transmitter.

In this configuration, when electric power is sold from a plurality of power generators, output voltages of the power generators are converted into identical voltage for electric power selling by the voltage conversion devices, respectively. That is, a plurality of sellers sell electric power by the identical voltage for electric power selling. Therefore, the system can suppress the condition that electric power selling cannot be provided.

The electric power selling system of the present invention may be configured that wherein the transmitter periodically supplies the voltage conversion device with the measured voltage value as the instruction value, wherein the voltage conversion device has different target voltage values, said voltage conversion device being configured, when receiving the measured voltage value, to select a target voltage value which is higher than and closest to the measured voltage value and to convert the output voltage of the power generator into the voltage for electric power selling based on the selected target voltage value.

In this configuration, the transmitter is configured to periodically transmit the measured voltage value. The voltage conversion device is configured to select a target voltage value which is higher than and closest to the received measured voltage value, and to convert output voltage of the power generator into voltage for electric power selling based on the selected target voltage value. Therefore, voltage for electric power selling can be made higher than voltage of the distribution line. For this reason, the system can suppress the condition that electric power selling cannot be provided.

The electric power selling system of the present invention may be configured that wherein the transmitter has different target voltage values, said transmitter being configured to select a target voltage value which is higher than and closest to the measured voltage value and to supply the voltage conversion device with the selected target voltage value as the instruction value, wherein the voltage conversion device is configured to convert the output voltage of the power generator into the voltage for electric power selling based on the received target voltage value.

In this configuration, the transmitter is configured to select a target voltage value which is higher than and closest to the measured voltage value, and to transmit the selected target voltage value. The voltage conversion device is configured to convert output voltage of the power generator into voltage for electric power selling based on the received target voltage value. Therefore, voltage for electric power selling can be made higher than voltage of the distribution line. For this reason, the system can suppress the condition that electric power selling cannot be provided.

In this case, the electric power selling system may be configured that wherein the transmitter is configured, when measured voltage value is less than a predetermined maximum target voltage value, and if the measured voltage value reaches the present target voltage value, to select another target voltage value which is higher than and closest to the measured voltage value and to supply the voltage conversion device with said another target voltage value, wherein the voltage conversion device is configured to convert the output voltage of the power generator into another voltage for electric power selling based on said another target voltage value.

In this configuration, if measured voltage value reaches the present target voltage value, the transmitter sends another target voltage value which is higher than and closest to the measured voltage value. For this reason, when voltage of the distribution line reaches the voltage for electric power selling, the transmitter sends a new target voltage value. Therefore, the system can suppress the condition that electric power selling cannot be provided.

In addition in the above case, the electric power selling system ay be configured that wherein the transmitter is configured, if measured voltage value becomes more than a predetermined value smaller than the present target voltage value, to select another target voltage value which is higher than and closest to the measured voltage value and to supply the voltage conversion device with said another target voltage value, wherein the voltage conversion device is configured to convert the output voltage of the power generator into another voltage for electric power selling based on said another target voltage value. In addition, the electric power selling system may be configured that wherein the transmitter is configured, if measured voltage value becomes more than a predetermined value larger than the present target voltage value, to select another target voltage value which is higher than and closest to the measured voltage value and to supply the voltage conversion device with said another target voltage value, wherein the voltage conversion device is configured to convert the output voltage of the power generator into another voltage for electric power selling based on said another target voltage value.

Voltage of the distribution line varies by a variety of factors. For example, voltage of the distribution line varies when service voltage of a transformer varies. In the above configurations, if measured voltage value becomes more than a predetermined value smaller than the present target voltage value, or if measured voltage value becomes more than a predetermined value larger than the present target voltage value, the transmitter transmits another target voltage value which is higher than and closest to the measured voltage value. Therefore, the instruction value can be renewed.

According to the present invention, an electric power selling system, that can suppress the condition that electric power selling cannot be provided while preventing the deterioration of supply power, is provided.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

First Embodiment

The first embodiment of the electric power selling system of the present invention is explained with reference to FIGS. 1 to 4. First, whole configuration of an electric power supplying system of a house, in which an electric power trading system including the present electric power selling system is utilized, is explained with reference to FIG. 1.

Figure 1:
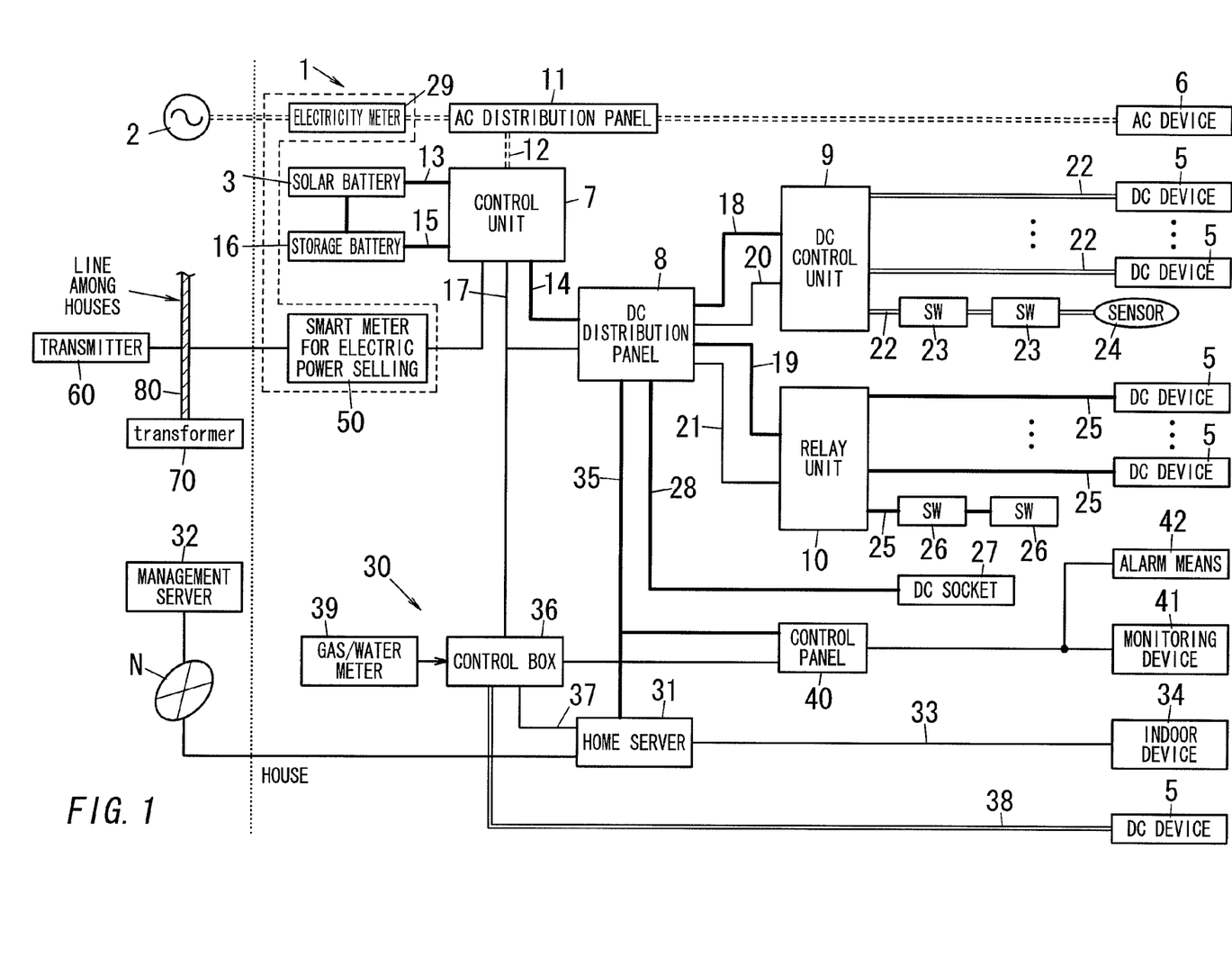
FIG. 1 is a diagram for illustrating the first embodiment of the electric power selling system according to the present invention, and is a block diagram showing a whole configuration of the electric power trading system of a house comprising the electric power selling system.

As shown in FIG. 1, the house is provided with an electric power supplying system 1. The electric power supplying system 1 is configured to supply various devices (lighting device, air-conditioner, home electrical appliances, audio-visuals, and so on) placed in the house with electric power. The electric power supplying system 1 is configured not only to make the various devices operate via a commercial alternating-current power source (AC power source) 2 for household as a power source, but also to supply the various devices with electric power generated by a solar battery 3 with sunlight. The electric power supplying system 1 is configured to supply electric power not only to DC devices 5 being configured to operate by direct-current power source (DC power source), but also to AC devices 6 being configured to operate by alternating-current power source (AC power source).

The electric power supplying system 1 includes a control unit 7 and a DC distribution panel 8 (in which a DC breaker is included), as distribution panels of the electric power supplying system 1. The control unit 7 is a voltage conversion device. In addition, the electric power supplying system 1 includes a DC control unit 9 and a relay unit 10, as controlling devices for controlling the behavior of DC devices 5 placed in the house.

An AC distribution panel 11 for branching AC power is connected with the control unit 7 via an electric power line for AC system 12. The control unit 7 is connected with the commercial AC power source 2 via the AC distribution panel 11, and is connected with the solar battery 3 via an electric power line for DC system 13. The control unit 7 is configured to receive AC power via the AC distribution panel 11, and to receive DC power from the solar battery 3. The control unit 7 is configured to convert this electric power into predetermined DC power as a power source of devices. The control unit 7 outputs converted DC power to the DC distribution panel 8 through an electric power line for DC system 14, or to a storage battery 16 through an electric power line for DC system 15 to store this electric power. The control unit 7 can receive AC power from the AC distribution panel 11. The control unit 7 also can convert DC power of the solar battery 3 or the storage battery 16 into AC power to supply the AC distribution panel 11 with the converted AC power. The control unit 7 is configured to transfer data to and from the DC distribution panel 8 through a signal line 17.

Figure 4:
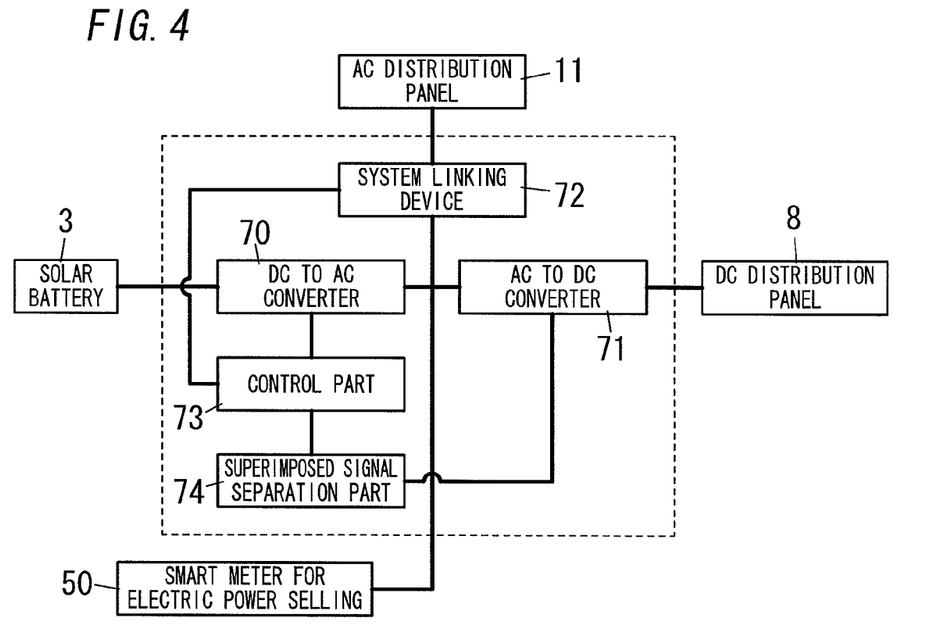
FIG. 4 is a diagram for illustrating the first embodiment of the electric power selling system according to the present invention, and is a block diagram showing a configuration of the control unit.

As shown in FIG. 4, the control unit 7 includes a DC to AC converter 70, an AC to DC converter 71, a system-linking device 72, a control part 73, and a superimposed signal separation part 74. The DC to AC converter 70 is configured to convert DC power supplied from the solar battery 3 into given AC power. The AC to DC converter 71 is configured to convert AC power provided from the DC to AC converter 70 into given DC power, and to output the converted DC power to the DC distribution panel 8. The system-linking device 72 is configured to make and break the connection with the AC distribution panel 11. The control part 73 is configured to regulate the DC to AC converter 70, the AC to DC converter 71 and the system linking device 72 to control the output voltage of the control unit 7.

The DC distribution panel 8 is a kind of a breaker compatible with DC power. The DC distribution panel 8 is configured to separate DC power supplied from the control unit 7. The DC distribution panel 8 is configured to output the separated DC power to the DC control unit 9 through an electric power line for DC system 18, and to the relay unit 10 through an electric power line for DC system 19. In addition, the DC distribution panel 8 is configured to transfer data to and from the DC control unit 9 through a signal line 20, and to transfer data to and from the relay unit 10 through a signal line 21.

A plurality of DC devices 5, 5 . . . are connected with the DC control unit 9. The DC devices 5 are connected with the DC control unit 9 via DC supply lines 22, respectively. A DC supply line 22 can carry both DC power and data by a pair of wires. The DC supply line 22 is configured to carry both electric power and data on the pair of wires by means of so-called power line communication. In power line communication, a communication signal for transmitting data is superimposed on DC voltage, which is a power source of a DC device, in the form of a high frequency carrier. The DC control unit 9 is configured to receive DC power for the DC devices 5 through the electric power line for DC system 18, and to decide a control method with respect to a corresponding DC device 5 based on an operation instruction received from the DC distribution panel 8 through the signal line 20. Then, the DC control unit 9 outputs DC voltage and an operation instruction to the instructed DC device 5 through corresponding DC supply line 22, and to control the behavior of the DC device 5.

Switches 23 used for operating the behavior of DC devices 5 in the house are connected with the DC control unit 9 via a DC supply line 22. In addition, a sensor 24 which is configured, for example, to detect transmission radio wave sent from an infrared remote controller is connected with the DC control unit 9 via the DC supply line 22. A DC device 5 is operated by communication signal transmitted through corresponding DC supply line 22. The communication signal is provided not only by an operation instruction from the DC distribution panel 8, but also by operation of the switches 23 or detection of the sensor 24.

A plurality of DC devices 5, 5 . . . are connected with the relay unit 10 via electric power lines for DC system 25, respectively. The relay unit 10 is configured to receive DC power for the DC devices 5 through the electric power line for DC system 19, and to decide a DC device 5 to be controlled based on an operation instruction received from the DC distribution panel 8 through the signal line 21. Then, the relay unit 10 controls the behavior of the designated DC device 5 by switching power supply to the electric power lines for DC system 25 through built-in relay. In addition, a plurality of switches 26 for manual operation of the DC devices 5 are connected with the relay unit 10. DC device 5 is controlled by turning on and off power the electric power line for DC system 25 through a relay by operation of a switch 26.

A DC socket 27 provided to the house as a wall outlet or a floor outlet, for example, is connected with the DC distribution panel 8 via an electric power line for DC system 28. Inserting a plug (not shown in figure) of a DC device into the DC socket 27, DC power can be supplied directly to this DC device.

An electricity meter 29 is connected between the commercial AC power source 2 and the AC distribution panel 11. The electricity meter 29 is configured to be read a meter remotely about the used amount of the commercial AC power source 2. The electricity meter 29 not only has feature of being read a meter remotely, but also has feature of power line communication or wireless communication, for example. The electricity meter 29 is configured to transmit the result of meter reading to an electric power company and so on, through power line communication or wireless communication etc.

The electric power supplying system 1 is provided with a network system 30, by which various devices in the house can be controlled via network communication. The network system 30 is provided with a home server 31 as a control unit of the network system 30. The home server 31 is connected with a management server 32 provided outside house via a network N. The network N is internet, for example. Also, the home server 31 is connected with an indoor device 34 via a signal line 33. The home server 31 works by DC power as a power source, which is obtained from the DC distribution panel 8 through a power line for DC system 35.

A control box 36, which is configured to manage the operation of the various devices in the house via the network communication, is connected with the home server 31 via a signal line 37. The control box 36 is connected with the control unit 7 and DC distribution panel 8 via the signal line 17. The control box 36 is configured to be able to control a DC device 5 directly via a DC supply line 38. For example, a gas/water meter 39, which is configured to be read a meter remotely about used amount of gas/water, is connected with the control box 36. In addition, a control panel 40 of the network system 30 is connected with control box 36. A monitoring device 41 including such as an intercom device, a sensor and a camera, and an alarm means 42 are connected with the control panel 40.

When an operation instruction about a device in the house is input through the network N, the home server 31 supplies the control box 36 with an instruction signal to operate the control box 36 so that the device operate according to the operation instruction. In addition, the home server 31 is configured to be able to provide the management server 32 with various kinds of information obtained from the gas/water meter 39 through the network N. Also, when receiving information, about which a problem is detected at the monitoring device 41, from the control panel 40, the home server 31 provides the management server 32 with this information through the network N.

The control unit 7 is connected with a line among houses 80 (commercial AC power source 2) via a smart meter for electric power selling 50. The smart meter for electric power selling 50 is an electric energy measurement device for measuring electric energy to be sold. During electric power selling, DC electric power generated by the solar battery 3, which is a power generator, is converted into AC voltage for electric power selling, capable of electric power selling. Then, the smart meter for electric power selling 50 measures the electric energy to be sold. After then, electric power is sold via the line among houses 80. It should be noted that the smart meter for electric power selling 50 is included in the electricity meter 29. In figures, for purposes of explanation, a signal line (power line) connected with the smart meter for electric power selling 50 and a power cable connected with the electricity meter 29 are shown separately. Practically, this signal line (power line) and this power cable are an identical power line.

Figure 2:
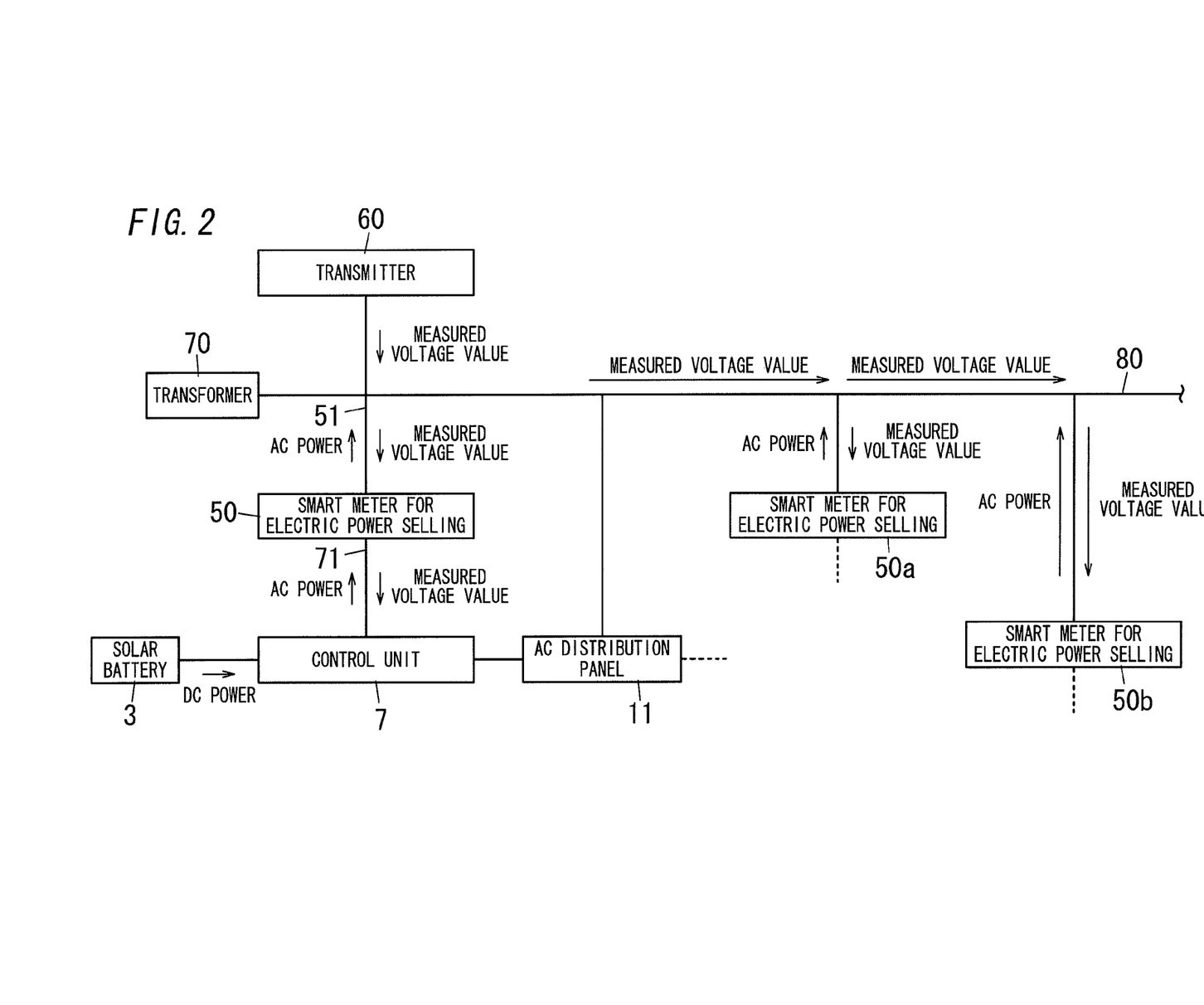
FIG. 2 is a diagram for illustrating the first embodiment of the electric power selling system according to the present invention, and is a block diagram showing a configuration of the electric power selling system.

As shown in FIG. 2, other houses are provided with similar electric power supplying systems. A plurality of smart meters for electric power selling are connected with the line among houses 80, respectively. In FIG. 2, only a smart meter for electric power selling 50, a smart meter for electric power selling 50*a* and a smart meter for electric power selling 50*b* are shown. However, the electric power selling system doesn't have a limit to the number of the smart meters for electric power selling. It should be noted that the smart meters for electric power selling are connected with the control units, the solar batteries, and so on, respectively. Therefore, there are a plurality of control units and a plurality of solar batteries in the system. That is, the electric power selling system includes a plurality of solar batteries as power generators and a plurality of control units. Each of the solar batteries is configured to generate electric power capable of electric power selling. The control units are connected with solar batteries, respectively. Each of the control units has similar functions, respectively. There is one transmitter 60 in the system.

The line among houses 80 means a low-tension distribution line with which the control units are connected via the smart meters for electric power selling, respectively. Specifically, it means a distribution line in a range, in which the plurality of smart meters for electric power selling 50, 50*a*, 50*b* etc. and the transmitter 60 are connected. Ordinarily, electric power converted into 100V by the transformer 70 is supplied to the line among houses 80. In FIG. 1, the line among houses 80 is a power line on which electric power is supplied from the commercial AC power source 2 connected with the AC distribution panel 11. That is, the line among houses 80 is defined as a distribution line within an effective communication range of a signal supplied from the transmitter 60. Electric power selling is made possible by connecting the line among houses 80 with the smart meter for electric power selling 50. In this embodiment, a local network is constructed within the range regarded as the line among houses 80, which is the range within which the signal of the transmitter 60 can be transmitted.

The transmitter 60 and the smart meter for electric power selling 50 are connected via a power line for electric power selling 51. Similarly, the smart meter for electric power selling 50 and the control unit 7 are connected via a power line for electric power selling 71. The power line for electric power selling 51 and the power line for electric power selling 71 are a part of the distribution line. Transmission and reception of information between the transmitter 60 and the smart meter for electric power selling 50, and transmission and reception of information between the smart meter for electric power selling 50 and the control unit 7, can be performed by a power line communication (PLC) technique. By using the PLC technique for the transmission and reception of information, there is no need to use another wiring for communication. Therefore, the system can simplify wiring and can reduce costs.

Figure 3:
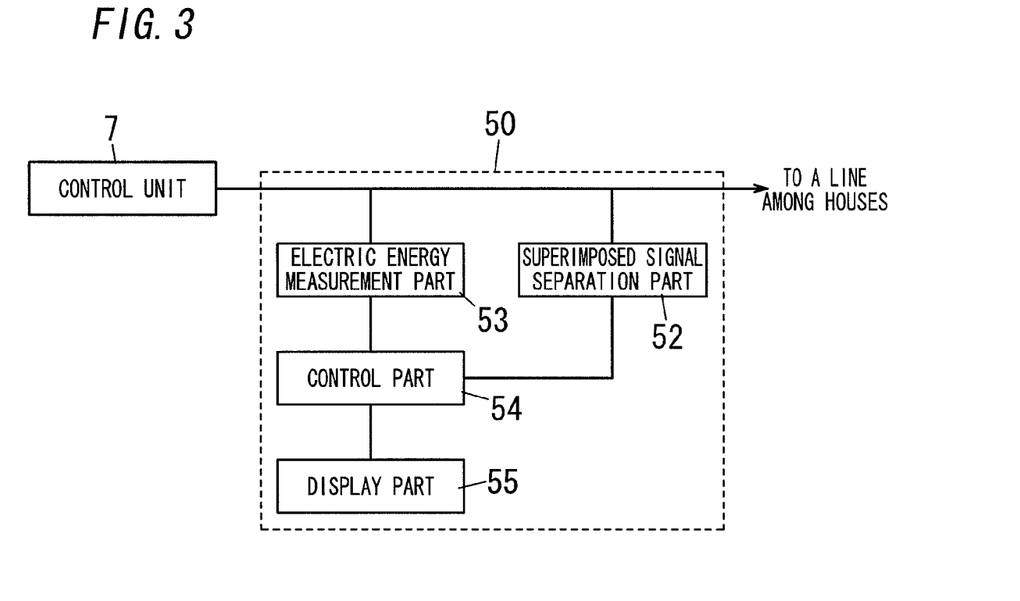
FIG. 3 is a diagram for illustrating the first embodiment of the electric power selling system according to the present invention, and is a block diagram showing a configuration of the Smart Meter for selling electric power.

As shown in FIG. 3, the smart meter for electric power selling 50 includes a electric energy measurement part 53 for measuring electric power to be sold, display part 55 for displaying sold electric energy, a control part 54 for controlling each parts, and a superimposed signal separation part 52 for separating a communication signal which is superimposed and transmitted on the power line. According to such a configuration, power line communication, by which the communication signal is superimposed and transmitted on the power line, can be conducted. As shown in FIG. 4, the control unit 7 also includes the superimposed signal separation part 74. Therefore, the control unit 7 can communicate with the smart meter for electric power selling 50 by power line communication.

The transmitter 60 is configured to measure voltage of the line among houses 80. Then, the transmitter 60 is configured to send an instruction value, which is obtained from the measured voltage value, as a superimposed signal through the line among houses 80. In this embodiment, the transmitter 60 is configured to send the measured voltage value as the instruction value.

In this embodiment, the transmitter 60 periodically sends the measured voltage value. The smart meter for electric power selling 50 receives the measured voltage value through the power line 51 connected with the line among houses 80. The smart meter for electric power selling 50 is configured to transfer the received measured voltage value to the control unit 7. The measured voltage value is transmitted as a superimposed signal through the power line 71. The control unit 7 is configured to decide a target voltage value from the received measured voltage value based on a predetermined correspondence relation. For details, control part 73 of the control unit 7 is configured to have different target voltage values. These different target voltage values are given by a predetermined step width. For example, the step width is 1V, and these different target voltage values are 100V, 101V, 102V and so on. It should be noted that the step width is not limited to 1V, and may be 0.5V or 2V etc., for example. When receiving the measured voltage value, the control part 73 of the control unit 7 selects one of target voltage value, which is higher than and closest to the received measured voltage value. For example, in the above case, when the control part 73 receives 100V as the measured voltage value, the control part 73 decides the target voltage value at 101V. As a result, DC power generated by the solar battery 3 is converted into AC power with 101V by the DC to AC converter 70. That is, the control unit 7 is configured to convert output voltage of the solar battery 3 into higher voltage than the voltage of line among houses 80. After then, electric energy is measured by the smart meter for electric power selling 50, and the electric power is supplied to the line among houses 80. In this way, electric power can be sold.

If there is less consumed power than sold power in the neighborhood, voltage of the line among houses 80 increases gradually. The measured voltage value, which is periodically sent from the transmitter 60, gradually increases according to the increase of the voltage of the line among houses 80. When a received measured voltage value reaches the present target voltage value (first target voltage value), the control unit 7 selects another target voltage value (second target voltage value) which is higher than and closest to the first target voltage value. Then, the control unit 7 converts the output voltage of the solar battery 3 into the voltage for electric power selling based on the second target voltage value. That is, the control unit 7 is configured to renew its target voltage value when the received measured voltage value reaches the present target voltage value.

In the above situation, electric power can be sold from another solar battery. For example, the transmitter 60 also sends the same measured voltage value (for example 100V) toward said another solar battery. Another control unit, which is connected with said another solar battery, decides a target voltage value at 101V just as the above control unit 7. In other words, each of the control units is configure to convert output voltage of its own solar battery into identical voltage for electric power selling, based on same measured voltage value transmitted from the transmitter 60. In this way, a plurality of sellers can sell electric power simultaneously.

It should be noted that when the received measured voltage value reaches a predetermined maximum target voltage value (for example 106V), a control unit doesn't renew the target voltage value. For this reason, voltage of the line among houses 80 doesn't exceed the maximum target voltage value. Therefore, deterioration of supply power can be prevented.

In addition, in this embodiment, voltage for electric power selling is decided based on actually measured voltage of the line among houses 80. Therefore, there is no need to set the voltage for electric power selling relatively high by anticipating the variation of voltage. Therefore, the system has large possibility about adjusting the voltage for electric power selling within a permitted range of variation of voltage. Therefore, the electric power selling system can suppress the condition that electric power selling cannot be provided while preventing the deterioration of supply power.

Second Embodiment

In the second embodiment, the transmitter 60 is configured to measure voltage of the line among houses 80. The transmitter 60 is configured to send a target voltage value as an instruction value. In this embodiment, the transmitter 60 is configured to decide a target voltage value from a measured voltage value based on a predetermined correspondence relation. For details, the transmitter 60 is configured to have different target voltage values. These different target voltage values are given by a predetermined step width. For example, the step width is 1V, and these different target voltage values are 100V, 101V, 102V and so on. It should be noted that the step width is not limited to 1V, and may be 0.5V or 2V etc., for example. The transmitter 60 is configured to select one of target voltage value, which is higher than and closest to the measured voltage value. For example, in the above case, if the measured voltage value is 100V, the transmitter 60 decides the target voltage value at 101V. Then, the transmitter 60 sends the target voltage value as the instruction value. The smart meter for electric power selling 50 receives the target voltage value through the power line 51 connected with the line among houses 80. The smart meter for electric power selling 50 is configured to transfer the received target voltage value to the control unit 7 through the power line 71. When the target voltage value is 101V, DC power generated by the solar battery 3 is converted into AC power with 101V by the DC to AC converter 70. That is, the control unit 7 is configured to convert output voltage of the solar battery 3 into higher voltage than the voltage of the line among houses 80. After then, electric energy is measured by the smart meter for electric power selling 50, and electric power is supplied to the line among houses 80. In this way, electric power can be sold.

If there is less consumed power than sold power in the neighborhood, voltage of the line among houses 80 increases gradually. The transmitter 60 is configured to measure voltage of the line among houses 80. When the measured voltage value increases to reach the present target voltage value (first target voltage value), the transmitter 60 selects another target voltage value (second target voltage value) which is higher than and closest to the present measured voltage value. Then, the transmitter 60 supplies the control unit 7 with the second target voltage value as the instruction value. When receiving the second target voltage value, the control unit 7 converts output voltage of the solar battery 3 into the voltage for electric power selling based on the second target voltage value. That is, the transmitter 60 is configured to renew the target voltage value when the measured voltage value reaches the present target voltage value.

In this situation, electric power can be sold from another solar battery. That is, each of the plurality of control units converts output voltage of its solar battery into identical voltage for electric power selling, based on same target voltage value supplied from the transmitter 60. In this way, a plurality of sellers can sell electric power simultaneously.

It should be noted that when the measured voltage value reaches a predetermined maximum target voltage value (for example 106V), the transmitter 60 doesn't renew the target voltage value. For this reason, voltage of the line among houses 80 doesn't exceed the maximum target voltage value. Therefore, deterioration of supply power can be prevented.

In addition, the transmitter 60 may be configured, if a measured voltage value becomes more than a predetermined value larger than the present target voltage value (first target voltage value), to select another target voltage value (second target voltage value) which is higher than and closest to the present measured voltage value, and to supply the control unit 7 with the second target voltage value. Said predetermined value is smaller than the step width of the different target voltage values. For example, if the step width is 1V, the predetermined value may be set at 0.1V.

Such a situation may occur if output voltage of the transformer 70 increases, for example. In this case, the transmitter 60 sends the second target voltage value obtained from the present measured voltage value. The control unit 7 converts output voltage of the solar battery 3 into voltage for electric power selling based on the second target voltage value.

In addition, the transmitter 60 may also be configured, if a measured voltage value becomes more than a predetermined value smaller than the present target voltage value (first target voltage value), to select another target voltage value (second target voltage value) which is higher than and closest to the present measured voltage value, and to supply the control unit 7 with the second target voltage value. Such a situation may occur if output voltage of the transformer 70 decreases, for example. In this case, the control unit 7 converts output voltage of the solar battery 3 into voltage for electric power selling based on the second target voltage value. By the way, in general, a standard value for service voltage (for example, 100V) is established for the low-tension distribution line. If the measured voltage value drops below the standard value, the transmitter 60 may send the standard value as the target voltage value.

As according to the above configurations, the target voltage value can be renewed.

Generally, the control unit 7 (voltage conversion device) contains inaccuracy from device to device. That is, if a control unit is going to output power with a particular voltage (for example, 102V), it is possible that the control unit outputs power with another voltage (for example, 101.6V) in practice. In order to compensate such an inaccuracy, the electric power selling system can be configured as follows.

In this configuration, the electric power selling system has an adjustment step and a performing step. In addition, the control unit 7 (voltage conversion device) includes a memory means. The electric power selling system is configured to implement the adjustment step when the transmitter 60 sends a particular target voltage value for the first time. For example, "104V", "105V", and so on, is sent as the target voltage value for the first time, the adjustment step is implemented. After the adjustment step, the performing step is implemented.

In the adjustment step, the transmitter 60 supplies the control unit 7 with the target voltage value. The control unit 7 receives the target voltage value, and converts output voltage of the solar battery 3 into voltage for electric power selling based on the received target voltage value. When a measured voltage value reaches the target voltage value, the transmitter 60 sends a reaching signal to the control unit 7. On the other hand, if a measured voltage value doesn't reach the target voltage value, the transmitter 60 doesn't send the reaching signal. If the reaching signal has not been sent from the transmitter 60 for a predetermined time, the control unit 7 increases the voltage for electric power selling by a predetermined step value. This predetermined step value may be 0.1V, 0.2V, 0.5V, for example. Until the reaching signal is transmitted from the transmitter 60, the control unit 7 increases the voltage for electric power selling with every predetermined times. After then, when a measured voltage value reaches the target voltage value, the transmitter 60 supplies control unit 7 with the reaching signal.

When the control unit 7 receives the reaching signal, the control unit 7 stores a correspondence relationship between the present target voltage value and the present voltage for electric power selling in the memory means.

In the performing step, when a target voltage value is sent from the transmitter 60, the control unit 7 converts output voltage of the solar battery 3 (power generator) into voltage for electric power selling based on the correspondence relationship stored in the memory means.

According to above configuration, each of the control units converts output voltage of its solar battery into voltage for electric power selling based on the correspondence relationship stored in its memory means. Therefore, even if the control units contain inaccuracy, each of the control units can convert output voltage of its own solar battery into identical voltage for electric power selling.

According to the above embodiments, following effects can be achieved.

(1) According to each of the above embodiments, the transmitter 60 is configured to measure voltage of the line among houses 80. The control unit 7 is configured to convert output voltage of the solar battery 3 into voltage for electric power selling based on the measured voltage value. For this reason, difference between the voltage for electric power selling and the voltage of the line among houses 80 can be made small. Therefore, more electric energy can be sold within a permitted range of variation of voltage than the prior configuration, in which the voltage for electric power selling is fixed. Then, even if a plurality of power generators simultaneously generate electric power, the system can suppress the condition that electric power selling cannot be provided while preventing the deterioration of supply power.

(2) According to each of the above embodiments, the smart meters for electric power selling for measuring generated electric energy of solar batteries, respectively, are further included. In addition, the transmitter 60 is configured to supply the control units with the instruction value via the smart meters for electric power selling, respectively. In general, a smart meter for electric power selling for measuring the generated electric energy is an essential device for an electric power selling system. Because the instruction value is transmitted via a smart meter for electric power selling, the instruction value can be transmitted to a control unit without adding other transmitter/receivers.

(3) According to each of the above embodiments, the transmitter 60 is configured to supply a smart meter for electric power selling with an instruction value through a power line for electric power selling. Therefore, there is no need to use another line for communication. A power line communication (PLC) technique, which is publicly known, can be used for the communication through the power line.

(4) According to each of the above embodiments, a smart meter for electric power selling transmits an instruction value to a control unit through a power line for electric power selling. Therefore, there is no need to use another line for communication. A power line communication (PLC) technique, which is publicly known, can be used for the communication. through a power line.

(5) According to each of the above embodiments, when electric power is sold from a plurality of solar batteries, output voltage of the solar batteries are converted into identical voltage for electric power selling by control units, respectively. That is, a plurality of sellers sell electric power by the identical voltage for electric power selling. Therefore, the system can suppress the condition that electric power selling cannot be provided.

(6) According to the first embodiment, the control unit 7 is configured to select a target voltage value which is higher than and closest to a received measured voltage value, and to convert output voltage of the solar battery 3 into voltage for electric power selling based on the selected target voltage value. For this reason, voltage for electric power selling becomes to be higher than voltage of the distribution line 80. Therefore, the system can suppress the condition that electric power selling cannot be provided. On the other hand, according to the second embodiment, the transmitter 60 is configured to send a target voltage value which is higher than and closest to a measured voltage value. The control unit 7 is configured to convert output voltage of the solar battery 3 into voltage for electric power selling based on the received target voltage value. For this reason, voltage for electric power selling becomes to be higher than voltage of the distribution line 80. Therefore, the system can suppress the condition that electric power selling cannot be provided.

In addition, above embodiments can be modified and varied as follows: In the above embodiments, the smart meter for electric power selling 50 is configured to transmit an instruction value to the control unit 7 through the power line for electric power selling 71. However, another configuration can be applied. For example, normal signal line (communication line) can be used. Also, signal can be transmitted by radio wave or light. Well-known technique may reduce costs.

In the above embodiments, the transmitter 60 is configured to supply an instruction value to the smart meter for electric power selling 50 through the power line for electric power selling 51. However, another configuration can be applied. For example, normal signal line (communication line) can be used. Also, signal can be transmitted by radio wave or light. Well-known technique may reduce costs.

In the above embodiments, the transmitter 60 is configured to supply an instruction value to the control unit 7 via the smart meter for electric power selling 50. However, another configuration can be applied. For example, normal signal line (communication line) can be used. The communication line can be simplified if the transmitter 60 is configured to supply the control unit 7 with the instruction value directly by using radio wave of light for communication.

INDUSTRIAL UTILITY

The present invention relates to the electric power selling system which can suppress the condition that electric power selling cannot be provided. Therefore, the present invention can be widely used industrially.

The invention claimed is:

1. An electric power selling system comprising:
a plurality of power generators respectively provided for a plurality of houses, each of plurality of power generators generates electric power; and
a plurality of voltage conversion devices each of which is connected with a corresponding one of the power generators and a distribution line provided between the houses and which is configured to convert output voltage of the corresponding one of the power generators into variable voltage for electric power selling, the plurality of voltage conversion devices respectively provided for the plurality of houses, wherein the electric power selling system further comprises a transmitter connected with the distribution line, the transmitter being configured to measure voltage of the distribution line and to supply the plurality of voltage conversion devices with an instruction value obtained based on the measured voltage value, and wherein each of the voltage conversion devices has a set of candidate voltage values that respectively correspond to voltage steps of equal voltage amount from a lowest one of the candidate target voltage values, each of the voltage conversion devices selects, when receiving the instruction value, a target voltage value which is higher than and closest to the instruction value and converts the output voltage of the corresponding one of the power generators into the voltage for electric power selling based on the selected target voltage value.

2. The electric power selling system as set forth in claim 1, wherein the distribution line is a low-tension distribution line connected with the plurality of voltage conversion devices, and wherein the instruction value is the measured voltage value of the distribution line measured by the transmitter.

3. The electric power selling system as set forth in claim 1, further comprising a plurality of electric energy measurement devices for measuring electric energy to be sold, wherein the transmitter supplies the voltage conversion devices with the instruction value via the plurality of electric energy measurement devices, respectively.

4. The electric power selling system as set forth in claim 3, wherein the transmitter and the electric energy measurement devices are connected by the distribution line, wherein the transmitter supplies the electric energy measurement devices with the instruction value through the distribution line.

5. The electric power selling system as set forth in claim 4, wherein the electric energy measurement devices and the voltage conversion devices are connected by the distribution line, wherein the electric energy measurement devices transmit the instruction value to the voltage conversion devices through the distribution line.

6. The electric power selling system as set forth in claim 3, wherein the electric energy measurement devices and the voltage conversion devices are connected by the distribution line, wherein the electric energy measurement devices transmit the instruction value to the voltage conversion devices through the distribution line.

7. The electric power selling system as set forth in claim 1, comprising a plurality of electric power supplying systems, wherein each of the electric power supplying systems comprises one of the power generators and one of the voltage conversion devices wherein each of the voltage conversion devices converts the output voltage of the corresponding one of the power generators into identical voltage for electric power selling based on the instruction value supplied from the transmitter.

8. The electric power selling system as set forth in claim 1, wherein the distribution line is a single distribution line that connects the single transmitter to the plurality of voltage conversion devices, and wherein the single transmitter is disposed remotely from the plurality of different houses.

9. A transmitter for use in an electric power selling system, the electric power selling system including: a plurality of power generators respectively provided for a plurality of houses, each of plurality of power generators generates electric power; and a plurality of voltage conversion devices each of which is connected with a corresponding one of the power generators and a distribution line provided between the houses and which is configured to convert output voltage of the corresponding one of the power generators into variable voltage for electric power selling, the plurality of voltage conversion devices respectively provided for the plurality of houses, the transmitter being connected with the distribution line, the transmitter comprising:

a measuring unit that measures voltage of the distribution line; and a supplying unit that supplies the plurality of voltage conversion devices with an instruction value obtained based on the measured voltage value, wherein the transmitter has a set of candidate voltage values that respectively correspond to voltage steps of equal voltage amount from a lowest one of the candidate target voltage values, the transmitter selects, from the set of candidate voltage values, a target voltage value which is higher than and closest to the measured voltage value and supplies the voltage conversion device with the selected target voltage value as the instruction value, wherein each of the voltage conversion devices converts the output voltage of the corresponding one of the power generators into the voltage for electric power selling based on the instruction value.

10. An electric power selling system comprising:

a plurality of power generators respectively provided for a plurality of houses, each of the power generators generates electric power; and a plurality of voltage conversion devices each of which is connected with a corresponding one of the power generators and a distribution line provided between the houses and which is configured to convert output voltage of the corresponding one of the power generators into variable voltage for electric power selling, the plurality of voltage conversion devices respectively provided for the plurality of houses, wherein the electric power selling system further comprises a transmitter connected with the distribution line, the transmitter being configured to measure voltage of the distribution line and to supply the plurality of voltage conversion devices with an instruction value obtained based on the measured voltage value, wherein the transmitter has a set of candidate target voltage values that respectively correspond to voltage steps of equal voltage amount from a lowest one of the candidate target voltage values, the transmitter selects, from the set of candidate target voltage values, a target voltage value which is higher than and closest to the measured voltage value and supplies the voltage conversion device with the selected target voltage value as the instruction value, and wherein each of the voltage conversion devices converts the output voltage of the corresponding one of the power generators into the voltage for electric power selling based on the instruction value.

11. The electric power selling system as set forth in claim 10, wherein the transmitter selects, when the measured voltage value is less than a predetermined maximum target voltage value, and when the measured voltage value reaches the preset target voltage value, another target voltage value which is higher than and closest to the measured voltage value and supplies the voltage conversion device with the another target voltage value, and wherein the voltage conversion device converts the output voltage of the power generator into another voltage for electric power selling based on the another target voltage value.

12. The electric power selling system as set forth in claim 10, wherein the transmitter selects, when the measured voltage value becomes smaller than the preset target voltage value by a predetermined value, another target voltage value which is higher than and closest to the measured voltage value and supplies the voltage conversion device with the another target voltage value, and wherein the voltage conversion device converts the output voltage of the power generator into another voltage for electric power selling based on the another target voltage value.

13. The electric power selling system as set forth in claim 10, wherein the transmitter selects, when the measured voltage value becomes larger than the preset target voltage value by a predetermined value, another target voltage value which is higher than and closest to the measured voltage value and supplies the voltage conversion device with the another target voltage value, and wherein the voltage conversion device converts the output voltage of the power generator into another voltage for electric power selling based on the another target voltage value.

14. The electric power selling system as set forth in claim 10, wherein the distribution line is a low-tension distribution line connected with the plurality of voltage conversion devices, and wherein the instruction value is the measured voltage value of the distribution line measured by the transmitter.

15. The electric power selling system as set forth in claim 10, further comprising a plurality of electric energy measurement devices for measuring electric energy to be sold, wherein the transmitter supplies the voltage conversion devices with the instruction value via the plurality of electric energy measurement devices, respectively.

16. The electric power selling system as set forth in claim 15, wherein the transmitter and the electric energy measurement devices are connected by the distribution line, and wherein the transmitter supplies the electric energy measurement devices with the instruction value through the distribution line.

17. The electric power selling system as set forth in claim 15, wherein the electric energy measurement devices and the voltage conversion devices are connected by the distribution line, and wherein the electric energy measurement devices transmit the instruction value to the voltage conversion devices through the distribution line.

18. The electric power selling system as set forth in claim 10, comprising a plurality of electric power supplying systems, wherein each of the electric power supplying systems comprises one of the power generators and one of the voltage conversion devices, and wherein each of the voltage conversion devices converts the output voltage of the corresponding one of the power generators into identical voltage for electric power selling based on the instruction value supplied from the transmitter.

19. The electric power selling system as set forth in claim 16, wherein the electric energy measurement devices and the voltage conversion devices are connected by the distribution line, and wherein the electric energy measurement devices transmit the instruction value to the voltage conversion devices through the distribution line.

20. The electric power selling system as set forth in claim 10, wherein the distribution line is a single distribution line that connects the single transmitter to the plurality of voltage conversion devices, and wherein the single transmitter is disposed remotely from the plurality of different houses.

* * * * *